United States Patent [19]

Vuletic et al.

[11] 4,135,914

[45] Jan. 23, 1979

[54] PROCESS FOR THE DIRECT REDUCTION OF METALLIC OXIDES

[75] Inventors: Bogdan Vuletic, Düsseldorf; Hans-Jürgen Klingelhöfer, Bochum, both of Fed. Rep. of Germany

[73] Assignee: Korf Engineering GmbH, Düsseldorf, Fed. Rep. of Germany

[21] Appl. No.: 765,652

[22] Filed: Feb. 4, 1977

[30] Foreign Application Priority Data

Feb. 7, 1976 [DE] Fed. Rep. of Germany ....... 2604795

[51] Int. Cl.$^2$ ............................................. C21B 13/02
[52] U.S. Cl. .......................................... 75/34; 75/25; 75/91
[58] Field of Search ..................... 75/25, 35; 266/155, 266/26, 34, 91

[56]  References Cited

U.S. PATENT DOCUMENTS

| 2,877,086 | 3/1959 | MacKay | 75/25 |
|---|---|---|---|
| 3,411,864 | 11/1968 | Pallinger | 75/25 |
| 3,607,225 | 9/1971 | Hatarescu et al. | 75/35 |
| 3,831,667 | 8/1974 | Kilgore et al. | 165/DIG. 1 |
| 4,049,502 | 9/1977 | Nagels | 75/41 |

Primary Examiner—M. J. Andrews

[57] ABSTRACT

A process is described for the direct reduction of metallic oxides, primarily iron ore, to form sponge iron in a direct reduction plant by means of reduction gases containing hydrogen, at least part of the water vapor produced by the reduction process and contained in the exhaust gas being eliminated in the form of condensate. Further, there is described an apparatus for carrying out the process.

1 Claim, 2 Drawing Figures

PROCESS FOR THE DIRECT REDUCTION OF METALLIC OXIDES

BACKGROUND OF THE INVENTION

In the direct reduction of iron ore, for example, in accordance with DT-AS 1 914 400, it is known to use cooling towers to remove heat produced by the process, and, at the same time to effect evaporation of the circulating water. Since the make-up water usually contains a certain salt content, the open water circuit used for this process does not only entail losses by evaporation, but also by clarification, because the salt content in the circulating water should not exceed a given value.

In order to compensate for these losses, a direct reduction plant with a capacity of 400,000 typ (metric tons per year) in dependence on the make-up water quality would need a quantity of make-up water ranging between 70 and 100 m$^3$/h. Any clogging of scrubbers, coolers, and cooling towers, which would lead to a shutdown of the plant and to a production loss, can be avoided when the make-up water meets certain quality requirements. In case the untreated water available does not meet these requirements, the make-up water has to be treated. Untreated water of a poor quality necessitates the use of a make-up water treatment which is rather expensive.

The basic concept of the present invention is to provide make-up water without great difficulties and at minimum cost, the quality of which is adequate for use in a direct reduction plant, even in such locations where only untreated water of poor quality is available. Thus, complicated and expensive make-up water treatment is unnecessary. Any clogging of scrubber and cooler packings is impeded by the supply of fully desalted water, and the quantity of salt in the reformer due to the water drops entrained, is reduced.

This problem is solved according to this invention by directing at least part of the purified condensate into the industrial water system, especially into the cooling water system of the direct reduction plant. Moreover, at least part of the cooling water utilized is retained in the form of a closed circuit with indirect heat exchangers as coolers, the latter being fed with sea water, river water, or air serving as cooling media.

In the process according to the present invention, the condensed water in the top gas scrubber during a direct reduction process is used as industrial water. This condensed water is nearly free from salt, thus corresponding to the requirements of the make-up water quality without necessitating any complicated and expensive make-up water treatment for the elimination of salt.

A direct reduction plant with a capacity of 400,000 typ produces approx. 10 m$^3$/h of fully desalted water. The water is generated by the reduction of iron oxides by means of the hydrogen in the reduction gases in accordance with the reaction:

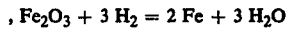, $Fe_2O_3 + 3 H_2 = 2 Fe + 3 H_2O$

Although the quantity of water generated per unit of time by the reduction process represents only part of the make-up water required per unit of time for an open cooling water circuit, i.e. a system with direct heat exchangers, the invention is advantageous even in a plant with an open cooling water circuit. However, the invention is of special importance with combined with a closed cooling water circuit or a partly open or partly closed cooling water system. In the case of a direct reduction plant with the capacity indicated, the losses (of a closed cooling water circuit) amount to approx. 1-3 m$^3$/h as regards clarification, and to approx. 1 m$^3$/h due to evaporation including losses by leakages. These losses can readily be compensated for by the in situ production of 10 m$^3$/h of fully desalted water. The surplus of the fully desalted water produced by the direct reduction process can be used as industrial water or for other purposes, or the cooling water circuit can be designed partly closed and partly open, an open system being preferred so that the quantity of evaporation water will correspond more or less to the surplus quantity of condensed water not used in the closed circuit. By means of a control device adjusting the make-up water supply to the open and to the closed system according to the quantity of condensed water produced the plant can be operated independently, without necessitating any external water supply.

When using a closed cooling water system, the process according to this invention does not only offer the advantage of the complete direct production of make-up water, but, moreover, involves the following additional advantages:

In direct reduction plants with open water systems, clogging of scrubber and cooler packings occurs at different intervals due to the quality of the water. The water quality is of great importance with regard to the continuously varying CO$_2$ content in the circulating water, caused by the CO$_2$ absorption in the scrubbers and the CO$_2$ extraction in the cooling towers.

Due to the high CO$_2$ content in the top gas and in the cooling gas of max. 25% and due to the overpressure of approx. 0.25 atm$_g$. in the scrubbers, the water reaches such a CO$_2$ concentration that there is a surplus of CO$_2$ in the return water. This charged water reacts with the metallic iron particles, decomposes these particles, and then flows to the thickener where part of the CO$_2$ is eliminated.

By irrigating the water in the cooling tower, the remaining CO$_2$ is led off to the atmosphere. Thereby, calcium bicarbonate is reduced to calcium carbonate, iron bicarbonate and iron sulphate to iron (III) hydroxide insoluble in water in accordance with the following equations:

, $Ca(HCO_3)_2 \rightarrow CaCO_3 + CO_2 + H_2O$

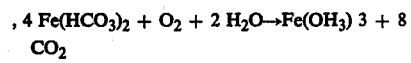, $4 Fe(HCO_3)_2 + O_2 + 2 H_2O \rightarrow Fe(OH_3) 3 + 8 CO_2$

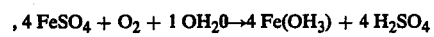, $4 FeSO_4 + O_2 + 1 OH_2O \rightarrow 4 Fe(OH_3) + 4 H_2SO_4$

The remaining calcium ions precipate in the form of carbonate; the iron ions flocculate in iron (III) hydroxide. Having started in the honeycombs of the cooling tower, this process continues in the cooling tower basin. The flocculated iron and the calcium ions are led to the scrubber packing by the water and are eliminated by the packing serving as a filter. The flocculated iron and the calcium ions are combined in the resulting slurry.

Thus, with every water circulation a new quantity of metallized iron particles is decomposed in the scrubbers, oxidized in the cooling towers to iron (III) hydroxide insoluble in water, and eliminated as slurry in the cooling towers and scrubber packings.

The poorer the water qualtiy, the higher the quantities of impurities which are eliminated. Sulphates and chlorides involve the greatest disadvantages. By means of the micro-organisms in the water systems, the sulphates are reduced to $H_2S$. $H_2S$ and iron form FeS, which precipitates in form of a slurry.

When replacing the cooling towers by indirect heat exchangers, the $CO_2$ variations in the system water are eliminated, thus, impeding the reduction of iron from its metallic form to Fe (III) hydroxide, which has a positive effect on the quality of the circulating water.

The problem is particularly acute in large plants where it is necessary to cope with higher gas quantities and higher pressure losses in the gas systems. Conventional rotary compressors have to be replaced by turbo compressors, which, in the case of open water systems, involves a great risk of damage to the apparatus employed.

Water particles, carried over from the scrubbers, which certain dissolved salts in the case of open water circuits evaporate due to the compression heating of the gas. The evaporation residues (ferrous particles and salts) deposit at the compressor (particularly on the impeller and casing), to which they become strongly bound. Thus unbalances and defects of the rotor as well as stoppages occur. Contrary to the open water-cooling system, the closed water circuit is fully desalted. The iron particles, absent the presence of salt which acts as a binding agent cannot result in extensive deposits. Therefore a closed water circuit enables the use of turbocompressors.

In order to exactly control the vapor content of the process gas, a process gas aftercooler has to be connected when rotary compressors are employed. In the process gas aftercooler, the heat produced by compression is destroyed and the gas is cooled down to 70–75° C. Afterwards this gas is heated up to approx. 400° C. in the recuperators.

When using turbocompressors the water vapor content can be controlled without the necessity of a process gas aftercooler in the process gas zone of the top gas scrubber.

The gas heated to approx. more than 200° C. in the turbo-compressor can be led directly to the recuperator for further heating. Thus lower investment costs and a decrease of the specific heat consumption are achieved.

By using a closed water circuit for the discharge of the excessive process heat in direct reduction plants, make-up water is only necessary before the start-up of the plant for the first filling of the closed circuit system. On the beginning of production excessive quantities of fully desalted water are produced in the reduction furnace, part of which is fed to the circuit to cover the evaporation and leakage losses.

Moreover the conventional clarifying of the thickened circuit water becomes unnecessary when using a closed water circuit. The plant does not furnish sewage because the remaining quantity of the produced which is not needed as make-up water can be fed to another installation, e.g. to a steel plant as make-up water.

The closed water circuit also shows positive effects on process gas production in a catalytic gas reformer when the latter is an integrated part of the total reduction process.

More specifically, the catalyst bed of the gas reformer is inactivated by the presence of sulphate, chloride and other salts contained in the water particles, i.e. the efficiency of the gas reformer is decreased. The fully desalted water provided by the closed circuit of the present invention however, contains no salts which are harmful to the catalyst. Thus, aging of the catalysts due to harmful components of the water system is substantially eliminated.

The invention is more particularly described by reference to the accompanying drawings, wherein.

Figure 1:
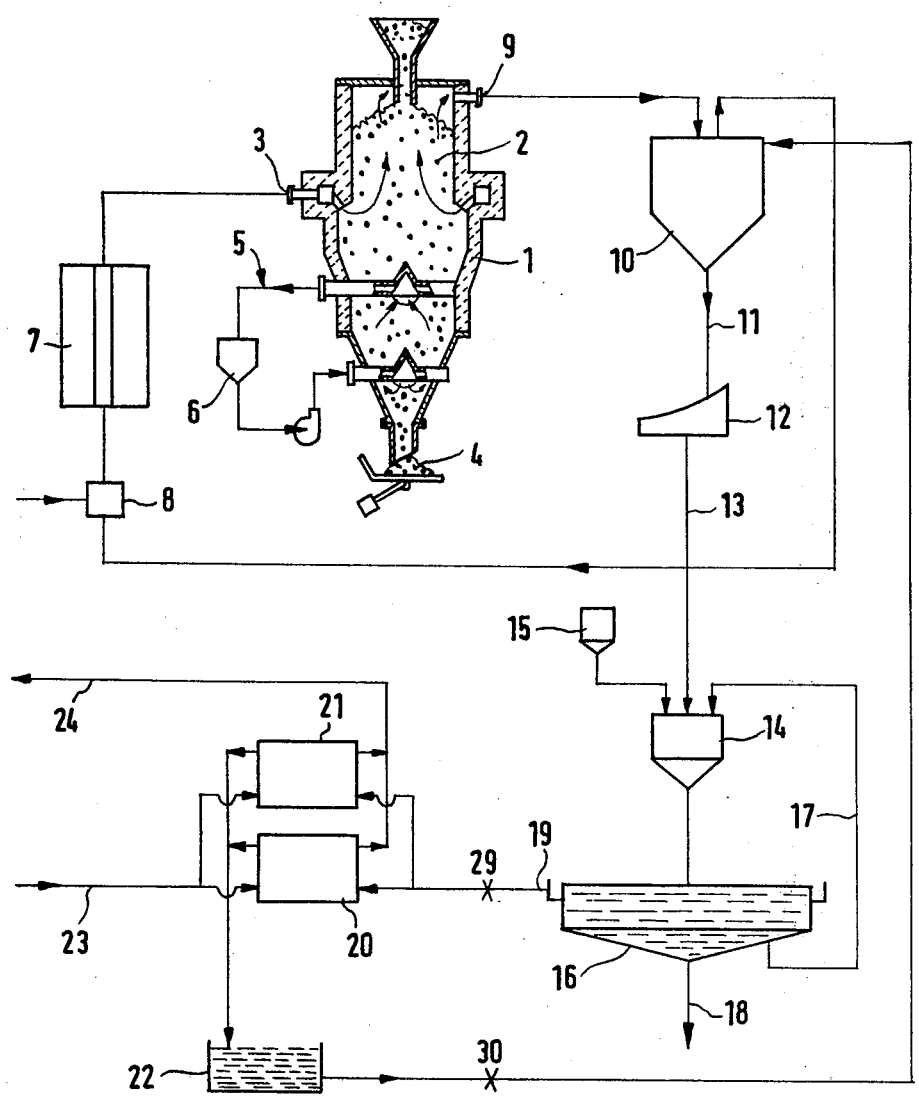
FIG. 1 shows a direct reduction plant with a closed water cooling system.

In the direct reduction plant shown on FIG. 1, iron ore 2 charged from above is reduced to sponge iron 4 in a shaft furnace 1 by means of reduction gases fed through a gas inlet 3. The sponge iron is extracted through an opening in the bottom of the shaft furnace. In the bottom part of the shaft furnace a cooling water circuit 5 is provided for cooling the sponge iron before leaving the furnace. A cooling gas scrubber is included in the cooling circuit. In a gas reformer 7, the reduction gas comprises hydrocarbons and oxidizing agents which are fed to a mixing facility 8. The main oxidizing agent is the top gas or exhaust gas respectively, emerging through an upper gas outlet 9 of the shaft furnace 1, after it is purged and cooled in a top gas scrubber 10.

The water vapor contained in the exhaust gas of the shaft furnace is discharged as condensate in the top gas scrubber 10 and is led partly via a coarse grain screen 12 and partly directly via a discharge pipe 13 to a mixing facility 14 from where it is led to a thickener 16 together with a flocculant from a flocculant station 15. Moreover the water circuit of the cooling gas scrubber 6 is connected to the coarse grain screen 12. For reasons of simplification that is not shown on the drawing. The thickener is connected to the mixing facility 14 by a return line 17 and besides a discharge pipe 18 for the contaminated water an overlow 19 is provided for the industrial water. This is fed to indirect heat exchangers 20 and 21. The number of heat exchangers is not limited but depends on the requirements of the process. From the heat exchangers, the cooled water is directed to a collecting tank 22, from where it is again led to the top gas scrubber or to other areas not shown. In this case sea water is used as cooling agent for the heat exchangers 20 and 21. It is led to the heat exchanger via a feed pipe 23 and discharged via a discharge pipe 24. Of course, river water or air can also be used as the cooling agent.

In direct reduction plants of conventional size, the quantity of condensed water separated from the exhaust gas is more extensive than the losses occurring in the closed water circuit. Accordingly, cooled and fully desalted water for other purposes e.g. for the water supply of a nearby steel plant can be taken from water tank 22.

Figure 2:
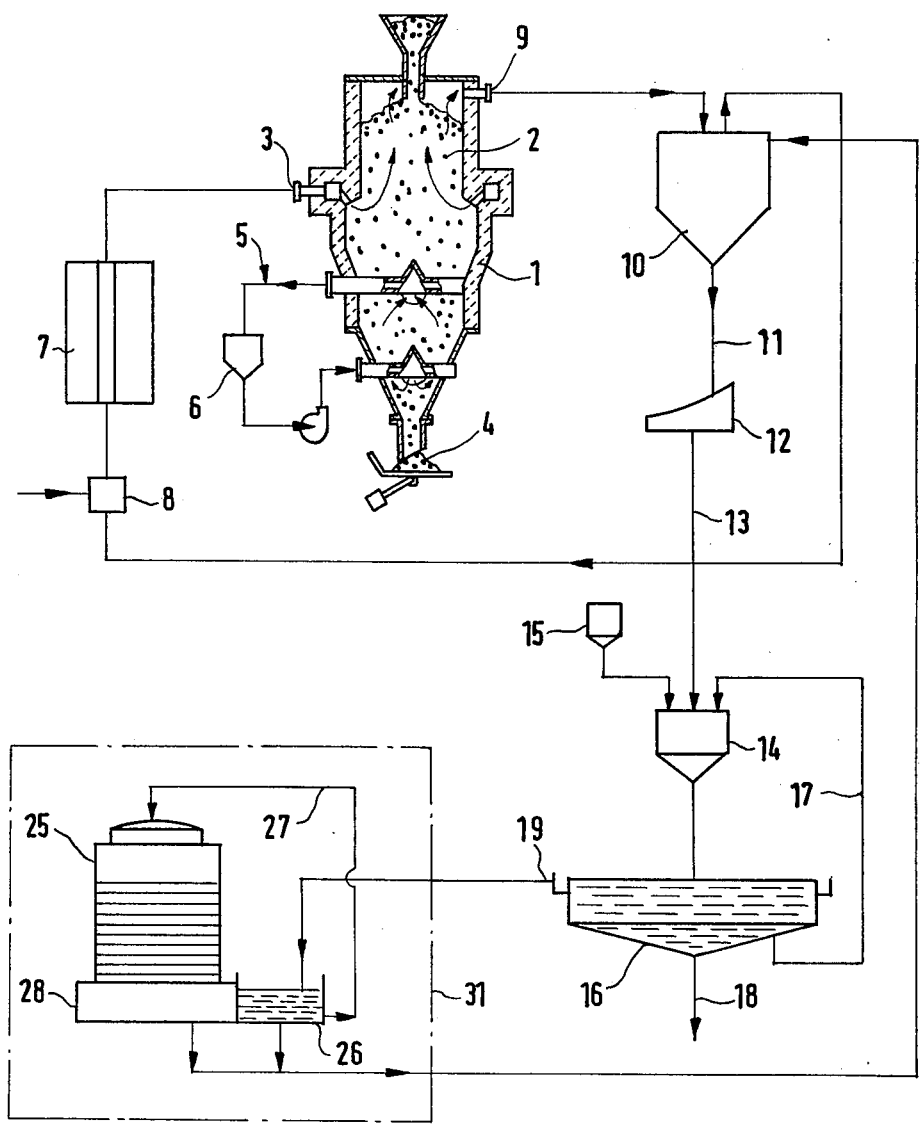
FIG. 2 shows a direct reduction plant with an open water cooling system.

FIG. 2 shows a direct reduction plant with an open water cooling system. As far as this plant is identical with the plant shown on FIG. 1 the same reference symbols are employed. In contrast to the plant of FIG. 1, a cooling tower 25 is provided instead of the direct heat exchangers. The cooling tower represents a larger number of cooling towers.

The cooling tower is provided with a collecting tank 26 receiving purged water from the overflow 19 of the thickener 16 which is then fed into the cooling tower 25 from above via a pipe 27. The cooled water is directed to a collecting tank 28 and from there is again led to the top gas scrubber if necessary after the addition of water from the collecting tank 26.

It is within the scope of the present invention to employ a combination of a closed water cooling system according to FIG. 1 and an open water cooling system according to FIG. 2, the open water cooling circuit being operated in a way that the evaporation in this system basically corresponds to the production of condensed water less any losses resulting from leakage and sludge. In such a plant, part 31 containing the cooling tower indicated on FIG. 2 by a dash-dot line, is connected in parallel at the points on FIG. 1 marked by crosses 29 and 30. The required distribution between the open and the closed cooling water systems is effected by valves and a control device not shown in the figures.

What is claimed is:

1. In a process for the direct reduction of metal oxide to iron sponge by means of reducing gases containing hydrogen gas in a reduction apparatus in which at least a portion of the water vapor formed in the reduction process and contained in the exhaust gas is separated as condensate by means of cooling water, the improvement comprising combining the condensate with the residual cooling water and reusing said condensate for cooling purposes, the water being cooled partially in an open and partially in a closed system, the two systems being arranged in parallel, the condensate produced being sufficient to compensate for the water evaporated in the open system and removed in the sludge produced by said system as well as for other normal leakage losses of cooling water.

* * * * *